US006628948B1

(12) United States Patent
Chavez, Jr. et al.

(10) Patent No.: US 6,628,948 B1
(45) Date of Patent: Sep. 30, 2003

(54) MODIFICATION OF RE-REGISTRATION BY A WIRELESS HANDSET IN RESPONSE TO A CHANGE OF LOGICAL COVERAGE AREA

(75) Inventors: David L. Chavez, Jr., Thornton, CO (US); John C. Moran, Thornton, CO (US); Stephen M. Thieler, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/515,151

(22) Filed: Feb. 29, 2000

(51) Int. Cl.[7] .............................. H04Q 7/20; H04M 3/00
(52) U.S. Cl. ........................ 455/435; 455/445; 455/419
(58) Field of Search ................................ 455/432, 433, 455/434, 435, 445, 446, 422, 419, 456, 561, 560

(56) References Cited

U.S. PATENT DOCUMENTS

| 5,754,959 A | | 5/1998 | Ueno et al. ................. 455/453 |
| 5,960,345 A | * | 9/1999 | Laatu .......................... 455/435 |
| 6,101,388 A | * | 8/2000 | Keshavachar ............... 455/435 |
| 6,370,382 B1 | * | 4/2002 | Kang et al. ................. 455/445 |
| 6,397,065 B1 | * | 5/2002 | Huusko et al. ............. 455/435 |
| 6,510,320 B1 | * | 1/2003 | Chavez, Jr. et al. ........ 455/446 |

OTHER PUBLICATIONS

Mungufa–Macario M et al: *Optimal Adaptive Location Area Design And Inactive Location Areas*, IEEE Vehicular Technology Conference, U.S., New York, IEEE, vol. Conf. 47, May 4, 1997, pp. 510–514.

* cited by examiner

Primary Examiner—Lee Nguyen
Assistant Examiner—Raymond Persino
(74) Attorney, Agent, or Firm—John C. Moran

(57) ABSTRACT

In a wireless switching system in which base stations dynamically re-arrange logical coverage areas, when a base station enters a new logical coverage area, wireless handsets registered on the base station do not have to report individually this change in logical coverage areas to a wireless switching system controlling the wireless switching system. The base station performing the transfer from one logical coverage area to another logical coverage area informs the wireless switching system controller of the change in logical coverage areas both for the base station itself and for each of the wireless handsets registered on the base station. The base station informs the wireless handsets that the logical coverage area is being changed and informs the wireless handsets that they do not have to re-register. This reporting by the base station greatly reduces the number of operations performed when the base station moves from one logical coverage area to another logical coverage area.

5 Claims, 9 Drawing Sheets

MODIFICATION OF RE-REGISTRATION BY A WIRELESS HANDSET IN RESPONSE TO A CHANGE OF LOGICAL COVERAGE AREA

TECHNICAL FIELD

This invention relates to telecommunications switching and, in particular, to wireless switching systems.

BACKGROUND OF THE INVENTION

A problem in the installing, provisioning, and deploying of in-building or campus personal communications systems (PCS) is the small physical size of the cells provided by the base stations. This is a problem because as an individual walks through a building with their wireless handset, the wireless handset is continuously re-registering on different base stations as it loses contacts with the previous base station. Such movements cause a large amount of traffic for the base stations as well as for the central controller that is providing overall control and switching for the wireless system. Since the central controller must be informed on which base station each wireless handset is registered, there is an advantage in the central controller knowing the exact base station on which a wireless handset is registered. When an incoming call is received for the handset, the wireless system controller can immediately set up the call via the base station to the wireless handset. If the wireless system controller simply knows that the wireless handset is registered on one of the base stations in the wireless system, then, the wireless system controller must attempt to set up the incoming call via all the base stations.

Within the prior art these problems have been resolved by the utilization of logical coverage areas. Base stations are grouped into logical coverage areas, and the wireless system controller is only informed that a wireless handset is registered on a base station within a particular logical coverage area. When an incoming call is received for the wireless handset, the wireless system controller only attempts to establish a connection to the wireless handset through the base stations that make up the logical coverage area of the wireless handset.

Within a logical coverage area, if a wireless handset moves from one base station to another, the wireless handset does not re-register on the other base station since it is in the same logical coverage area. This greatly reduces the number of re-registrations and assists in the amount of work that must be done to route incoming calls to a wireless handset. However, when a wireless handset moves to a new logical coverage area, the wireless handset must re-register on a base station in the new logical coverage area. If during re-deployment of base stations within a wireless switching system, a base station is moved from one logical coverage area to another logical coverage area, all of the wireless handsets registered on the base station must re-register so that the wireless system controller is informed that the wireless handsets are now part of the new logical coverage area.

SUMMARY OF THE INVENTION

The foregoing problems are solved, and a technical advance is achieved, by an apparatus and method for use in a wireless switching system in which base stations dynamically re-arrange logical coverage areas with the apparatus and method providing that when a base station enters a new logical coverage area the wireless handsets registered on the base station do not have to report individually this change in logical coverage areas to a wireless switching system controlling the wireless switching system. The base station performing the transfer from one logical coverage area to another logical coverage area informs the wireless switching system controller of the change in logical coverage areas both for the base station itself and for each of the wireless handsets registered on the base station. The base station informs the wireless handsets that the logical coverage area is being changed and informs the wireless handsets that they do not have to re-register. Advantageously, the reporting by the base station greatly reduces the operations that are required to be performed when the base station moves from one logical coverage area to another logical coverage area.

Other and further aspects of the present invention will become apparent during the course of the following description and by reference to the accompanying drawing.

DETAILED DESCRIPTION

Figure 1:
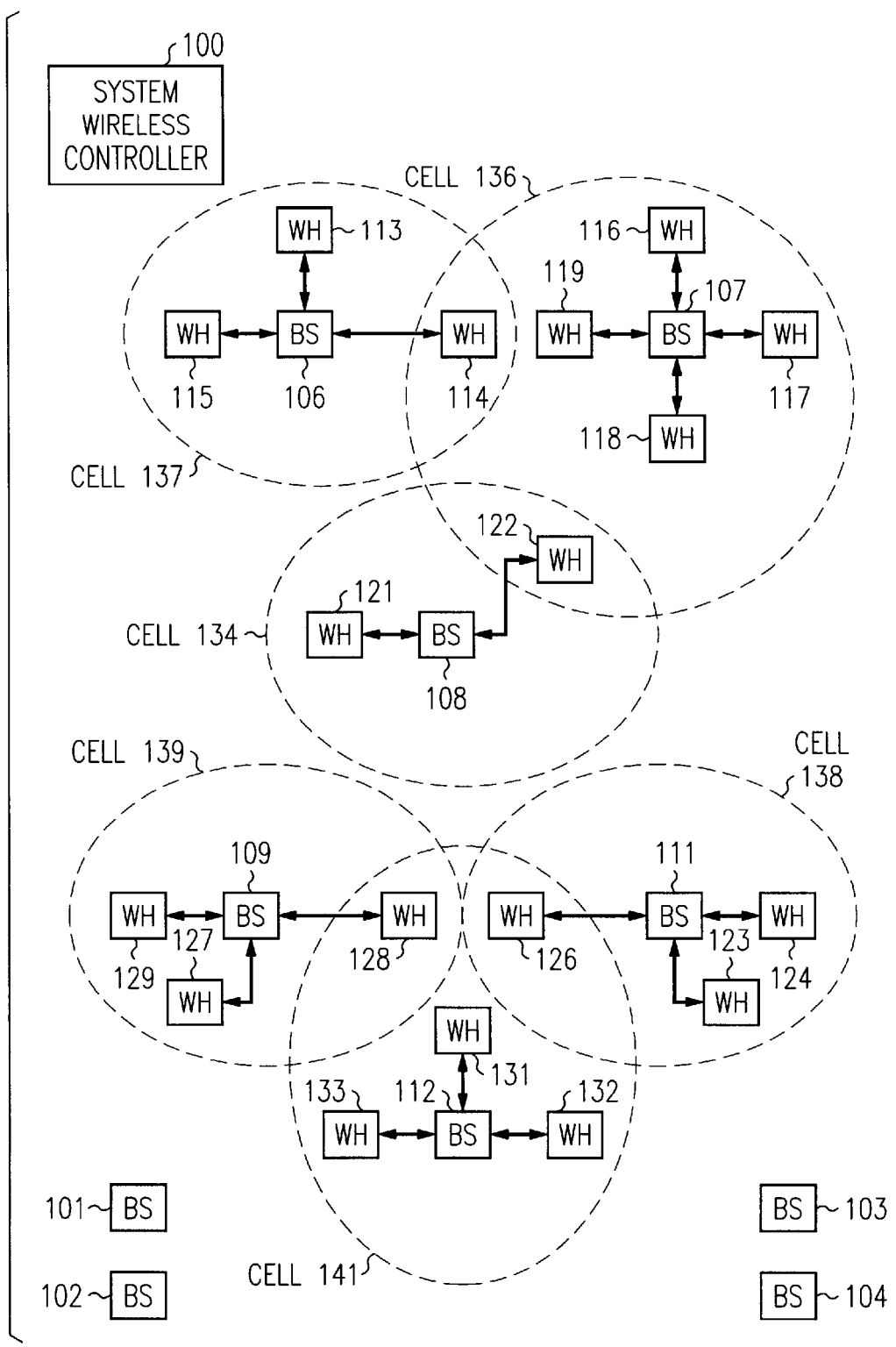
FIGS. 1–4 illustrate, in block diagram form, a wireless switching system for use with the invention.
Figure 2:
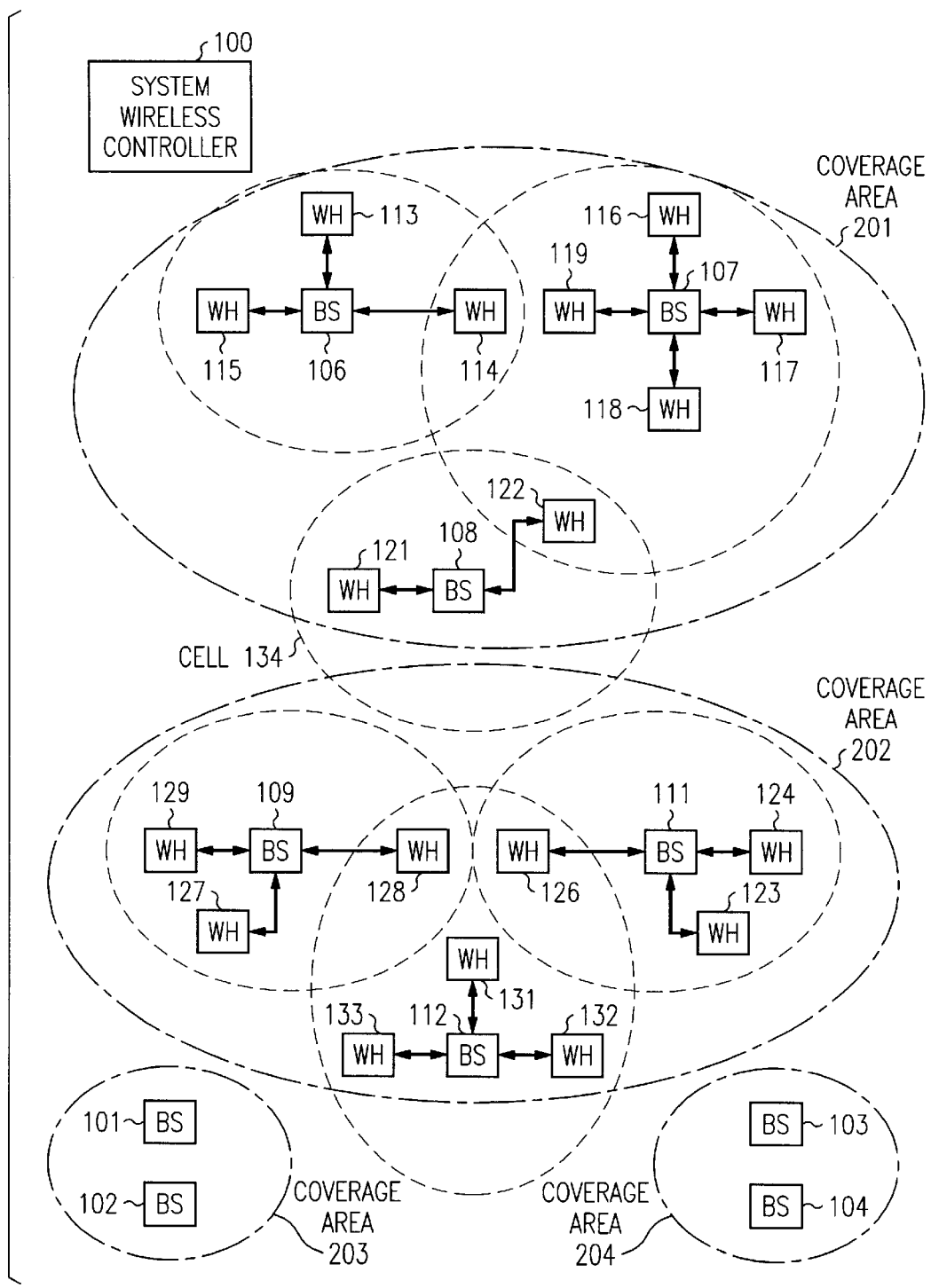

FIG. 1 illustrates a wireless switching system that has wireless handsets (WH) 113–133 which are capable of registering and placing and receiving calls on base stations (BS) 101–112. The base stations are interconnected by fixed links not illustrated in FIG. 1 to system wireless controller 100. System wireless controller 100 provides overall control of the wireless system and provides the necessary switching of audio information between the wireless handsets. FIG. 1 illustrates the initial state of the system before logical coverage areas are established. Cells 134–141 illustrate the radio coverage of individual base stations. For example, cell 134 is the radio coverage area of base station 108. Double-ended arrows attaching a wireless handset to a base station indicate that the wireless handset is registered on that base station. In a first embodiment of the invention, base stations initially interrogate each wireless handset registered on the base station to determine in which other cells, the wireless handset is registered. For example, base station 108 interrogates its registered wireless handset and determine that wireless handset 122 is within cell 136 of base station 107. Base station 108 then communicates with base station 107 via the fixed links through system wireless controller 100 to determine that base stations 107 and 108 should be in a logical coverage group. Base station 106 performs a similar operation with respect to wireless handset 114. The logical coverage area that results from the communication between base stations 106–108 is logical coverage area 201 as illustrated in FIG. 2. Similarly, base stations 109–112 establish coverage area 202 as illustrated in FIG. 2. The reason that logical coverage area 202 is established is because wireless handsets 128 and 126 are within cell 141 of base station 112 but are registered on base stations 109 and 111, respectively. Similarly, base stations 101 and 102 also have a common wireless handset, although not illustrated, and form coverage area 203. Similarly, coverage area 204 is formed to include base stations 103 and 104. After a group of base stations such as base stations 106–108 have determined they should be in a logical coverage area, this fact must be communicated to system wireless controller 100 so that it can assign a logical coverage area number to the determined logical coverage area and know the identity of the base stations in the determined logical coverage area.

When wireless handset 121 is in logical coverage area 201 and system wireless controller 100 receives a call for wireless handset 121, system wireless controller 100 sends call setup messages to base stations 106–108 since system wireless controller 100 sends setup messages to all of the base stations in logical coverage area 201. If logical coverage areas were not utilized, system wireless controller 100 would either have to send call setup messages to all of the base stations illustrated in FIG. 1, or each time, wireless handset 121 re-registered on a base station, this re-registration would have to be reported back to system wireless controller 100.

Using logical coverage areas, if wireless handset 121 moves into cell 137 of base station 106, wireless handset 121 will not re-register because it detects that it has not left logical coverage area 201. Wireless handset 121 knows that it has not left logical coverage area 201 because base stations 106–108 each broadcast on the broadcast control channel (BCCH) the logical coverage area number. Hence, when wireless handset 121 moves into cell 137 it is aware from information contained in the BCCH broadcasted by base station 107 that it is still in logical coverage area 201. If wireless handset 121 had entered cell 139 of base station 109, wireless handset 121 would re-register since it detects from information transmitted by base station 109 that it had changed its logical coverage area. This re-registration of wireless handset 121 on base station 109 involves operations by system wireless controller 100 and base station 109. In addition, wireless handset 121 expends a large amount of electrical energy from its battery in performing its portion of the re-registration operation.

Figure 3:
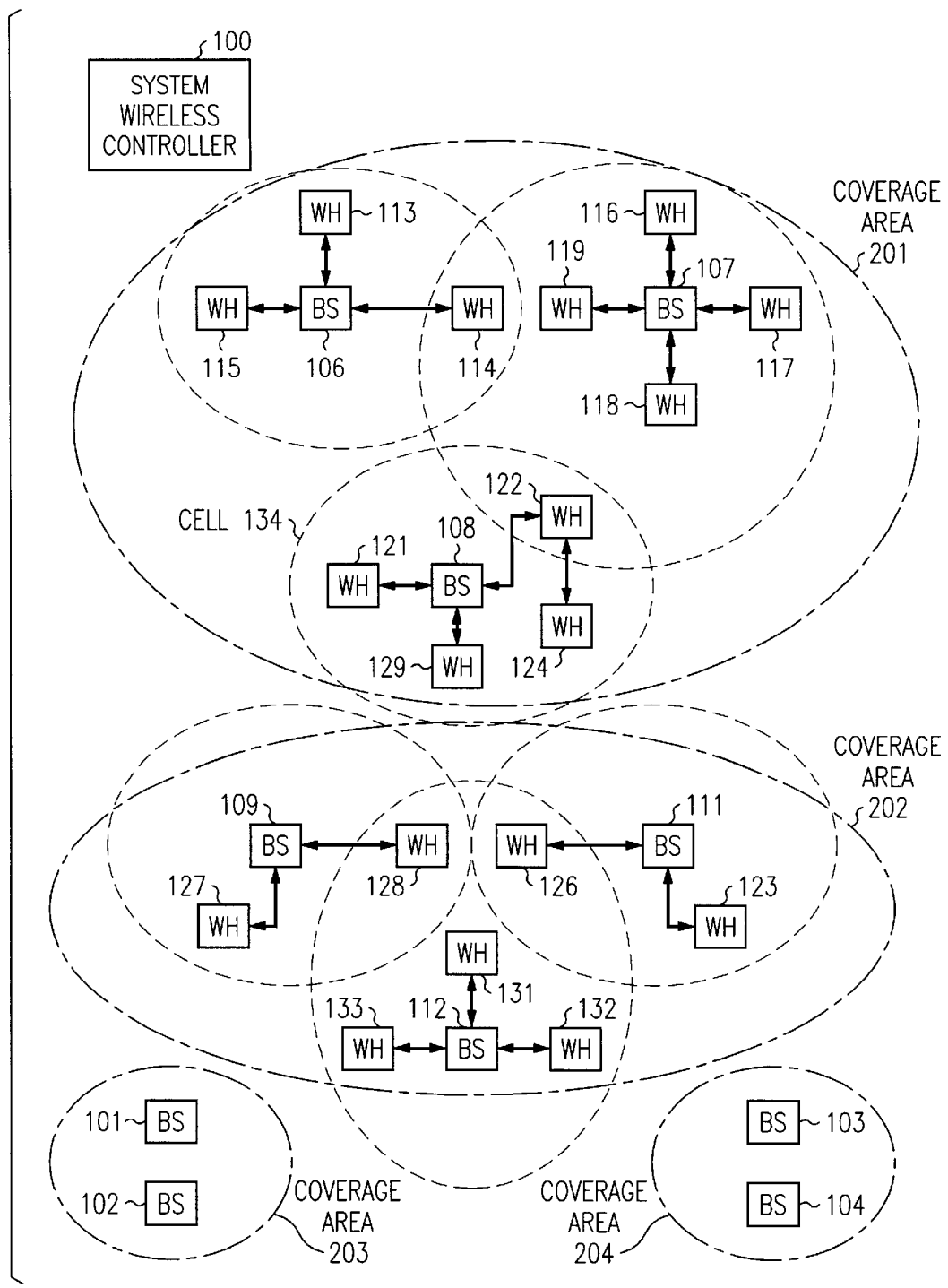

Consider now an example of the dynamic rearrangement of logical coverage areas based on the movement of wireless handsets. Assume that wireless handsets 124 and 129 leave cells 138 and 139, respectively, and enter cell 134 in a short period of time as illustrated in FIG. 3. Upon detecting the registration of wireless handsets 124 and 129, base station 108 uses this fact as an indication that there will be a general movement of wireless handsets to cell 134 from logical coverage area 202.

Figure 4:
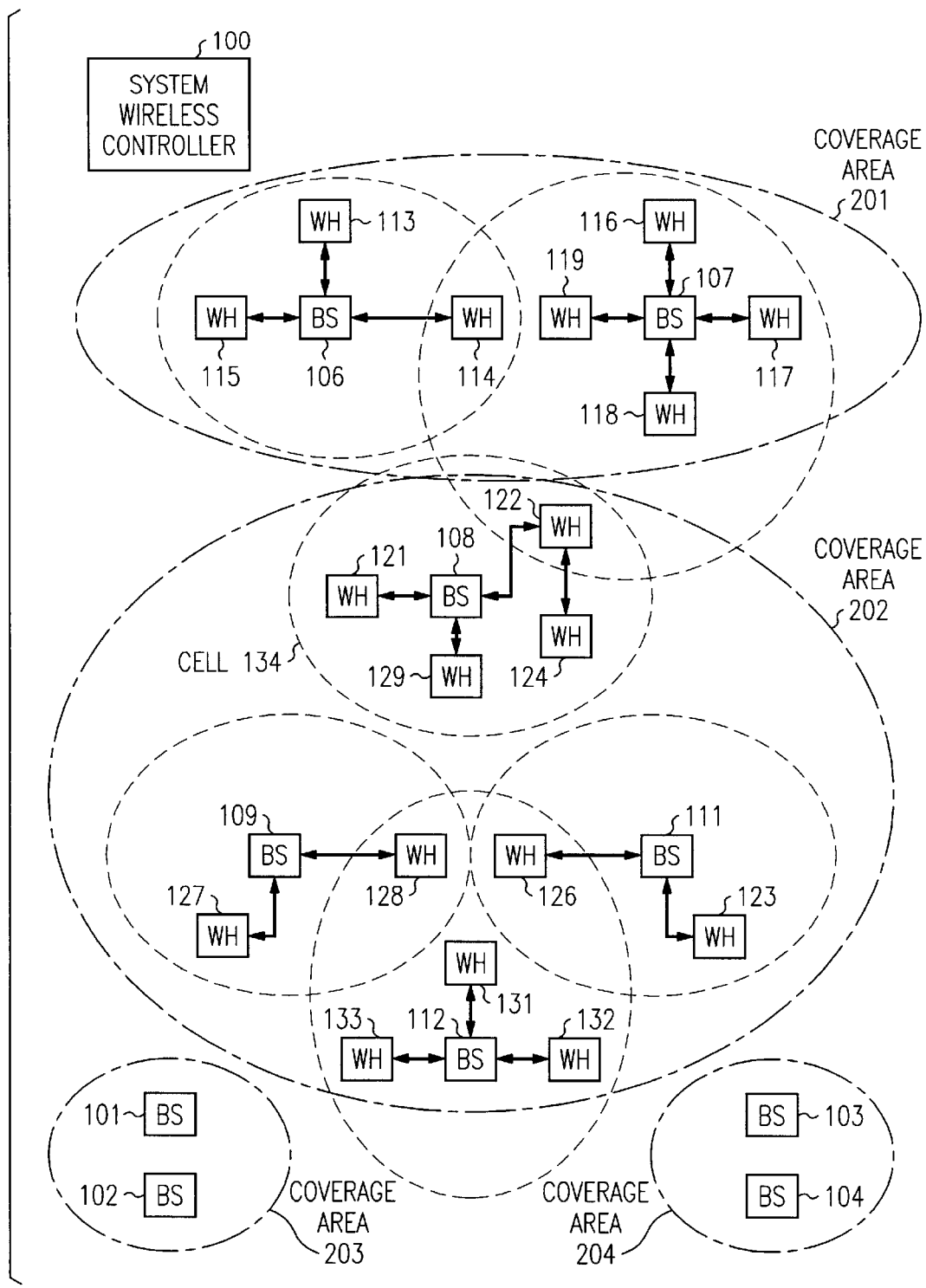

In response to the rapid registration of wireless handsets 124 and 129 from logical coverage area 202, base station 108 determines that it should be part of logical coverage area 202 in anticipation of more wireless handsets from logical coverage area 202 registering on base station 108. First, base station negotiates its entry into logical coverage area 202 with base stations 109–112 by the transmission of messages to these base stations via system controller 100 and the wired links that the base stations maintain to system wireless controller 100. Second, after the negotiations have been successfully completed with base stations 109–112, base station 108 communicates to base stations 106 and 107 of logical coverage area 201 that base station 108 is transferring out of coverage area 201. Third, base station 108 via its BCCH transmits to wireless handsets 121, 122, 124, and 129 that they are no longer part of logical coverage area 201 and are part of logical coverage area 201. In accordance with the invention base station 108 also specifies that the handsets do not have to re-register. Finally, base station 108 transmits to system wireless controller 100 a message for each of its presently registered wireless handsets that informs system wireless controller 100 that these wireless handsets are now part of logical coverage area 202. FIG. 4 illustrates the configuration of the wireless switching system after base station 108 becomes part of logical coverage area 202.

Figure 5:
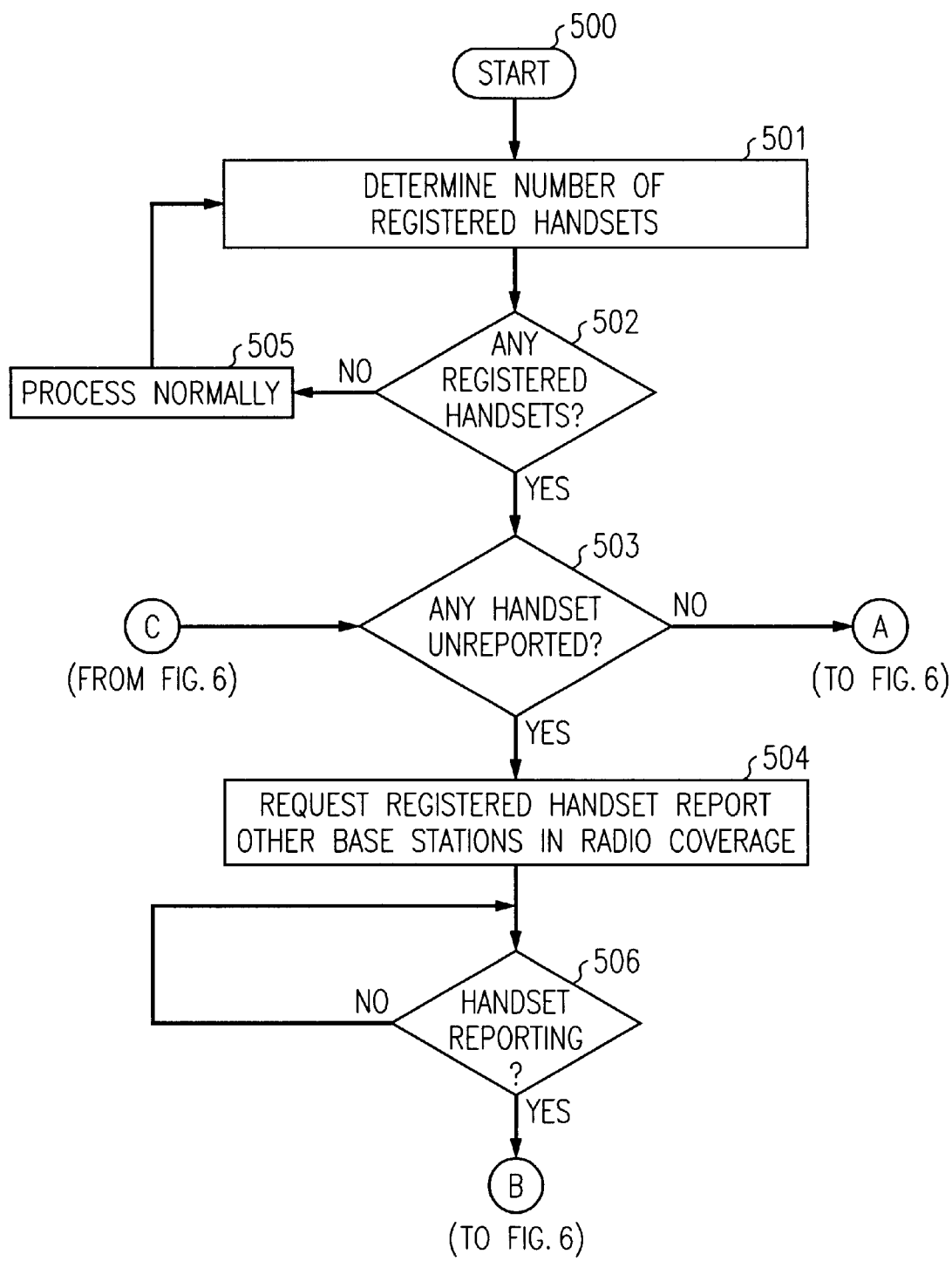
FIGS. 5–9 illustrate, in flow chart form, steps performed by a base station in implementing the invention.
Figure 6:
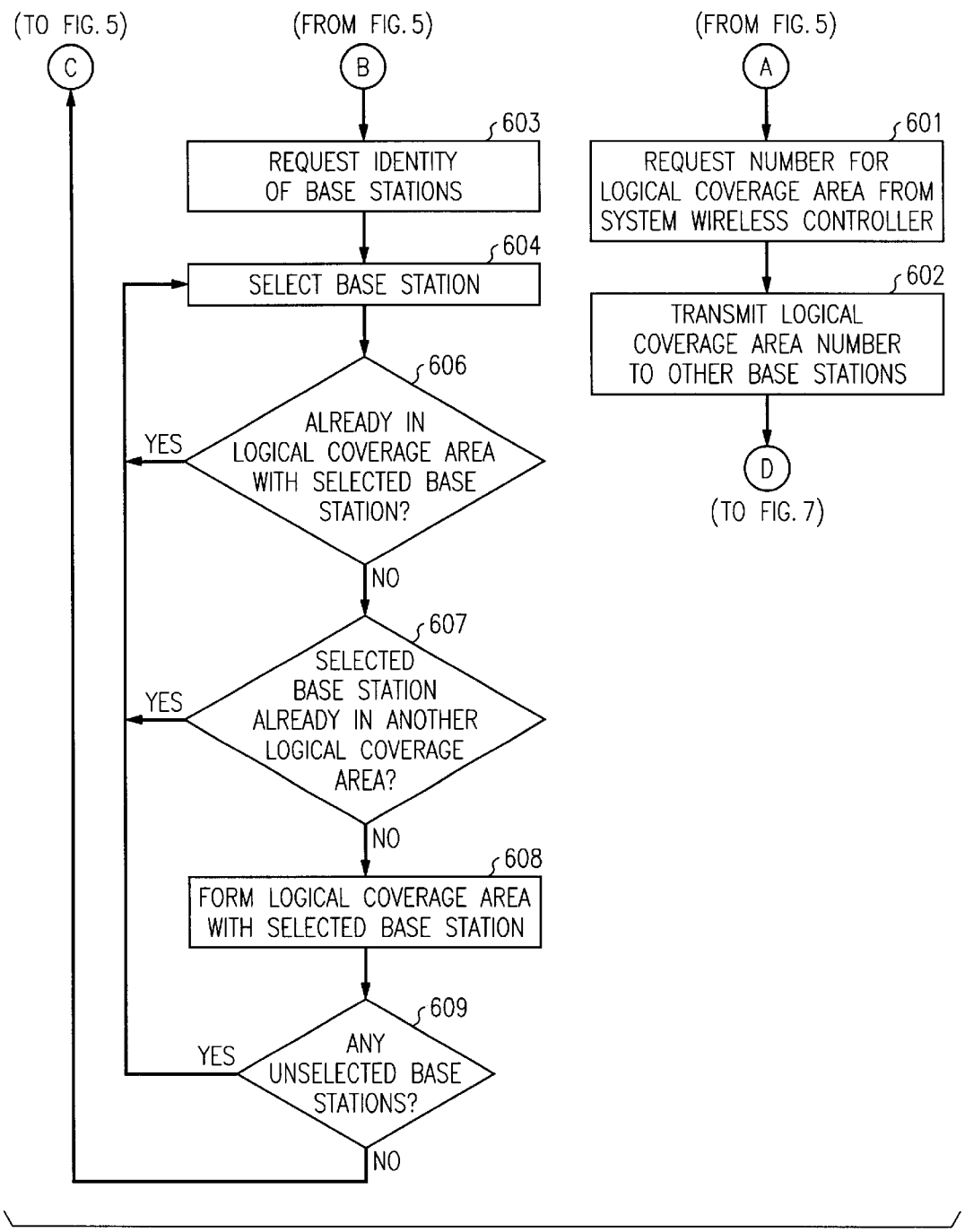

FIGS. 5 and 6 illustrate the steps performed by a base station in initially establishing a logical coverage area. Once started from block 500, the base station first determines the number of registered handsets that are registered on the base station in block 501. Then, decision block 502 determines if there are any registered handsets. If the answer is no, normal processing is performed in block 505 before control is transferred back to block 501. If the answer in decision block 502 is yes, decision block 503 determines if any of the registered handsets are unreported. If the answer in decision block 503 is yes, block 504 requests that a registered handset report other base stations in the radio coverage area of the registered handset before transferring control to decision block 506. The latter decision block waits until the requested handset reports and then transfers control to block 603 of FIG. 6.

Block 603 requests the identification of the other base stations from the requested handset. Block 604 selects one of the base stations identified in block 603. Decision block 606 then determines if the selected base station is already in a logical coverage area with the base station that is performing the steps of FIGS. 5 and 6. If the answer is yes, control is transferred back to block 604. If the answer is no, control is transferred by decision block 606 to decision block 607 that determines whether the selected base station is already in another logical coverage area. If the answer is yes in decision block 607, control is transferred back to block 604. If the answer is no in decision block 607, block 608 contacts the selected base station and forms it into a new logical coverage area before transferring control to decision block 609. The latter decision block determines if there are any more unselected base stations reported by the reporting handset that supplied a list of base stations in block 603. If the answer is yes, control is transferred back to block 604 so that a new base station can be selected. If the answer is no in decision block 609, control is transferred back to decision block 503 of FIG. 5.

When all of the handsets that are registered on the base station executing the steps of FIGS. 5 and 6 have reported, this fact is determined by decision block 503 which transfers control to block 601 of FIG. 6. Block 601 requests a number for the new logical-coverage area that is being formed from the system wireless controller, and block 602 transmits this logical coverage area number to the other base stations that are being formed into the new logical coverage area. These are the base stations that were determined and designated in block 608.

Figure 7:
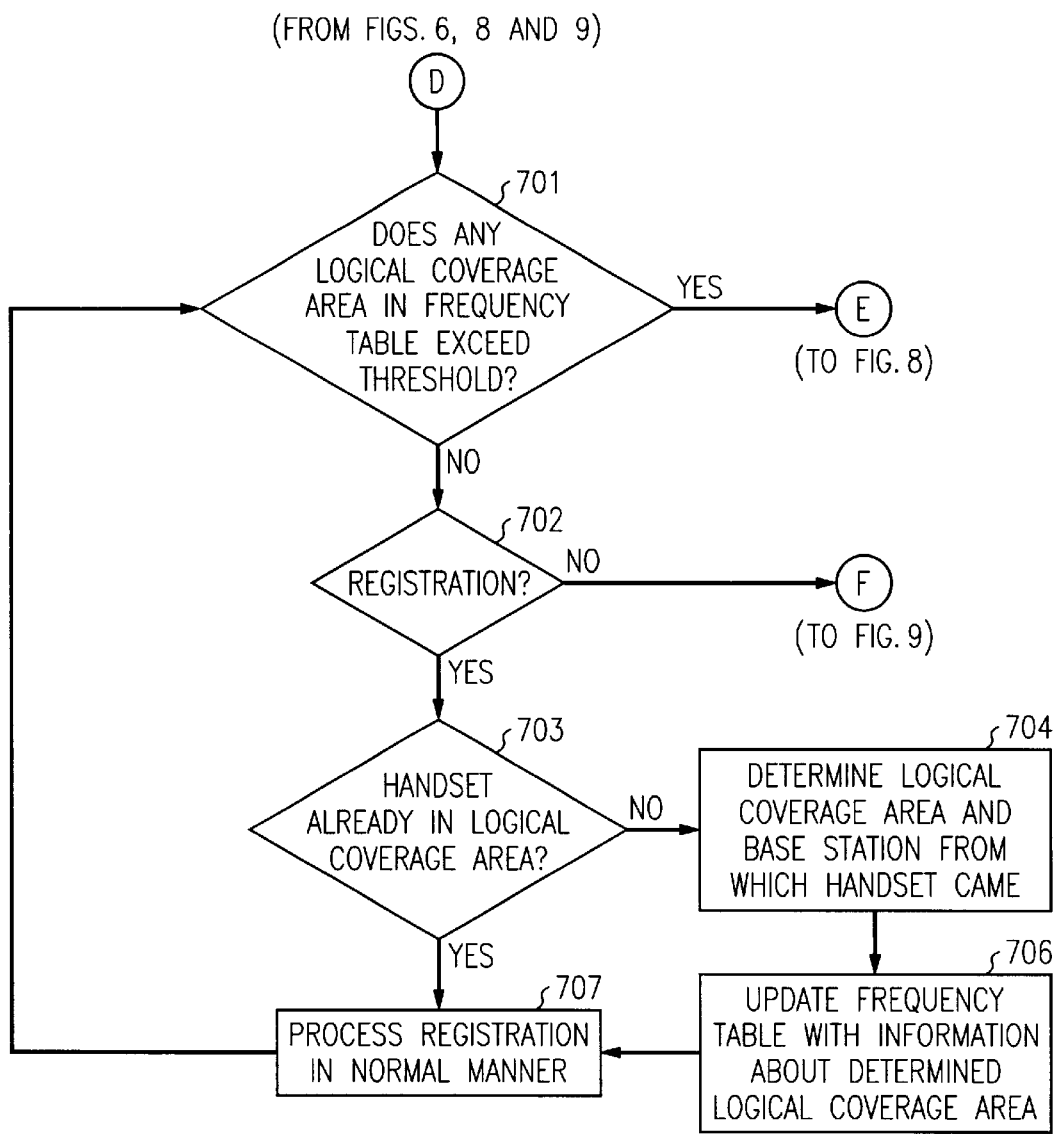
Figure 8:
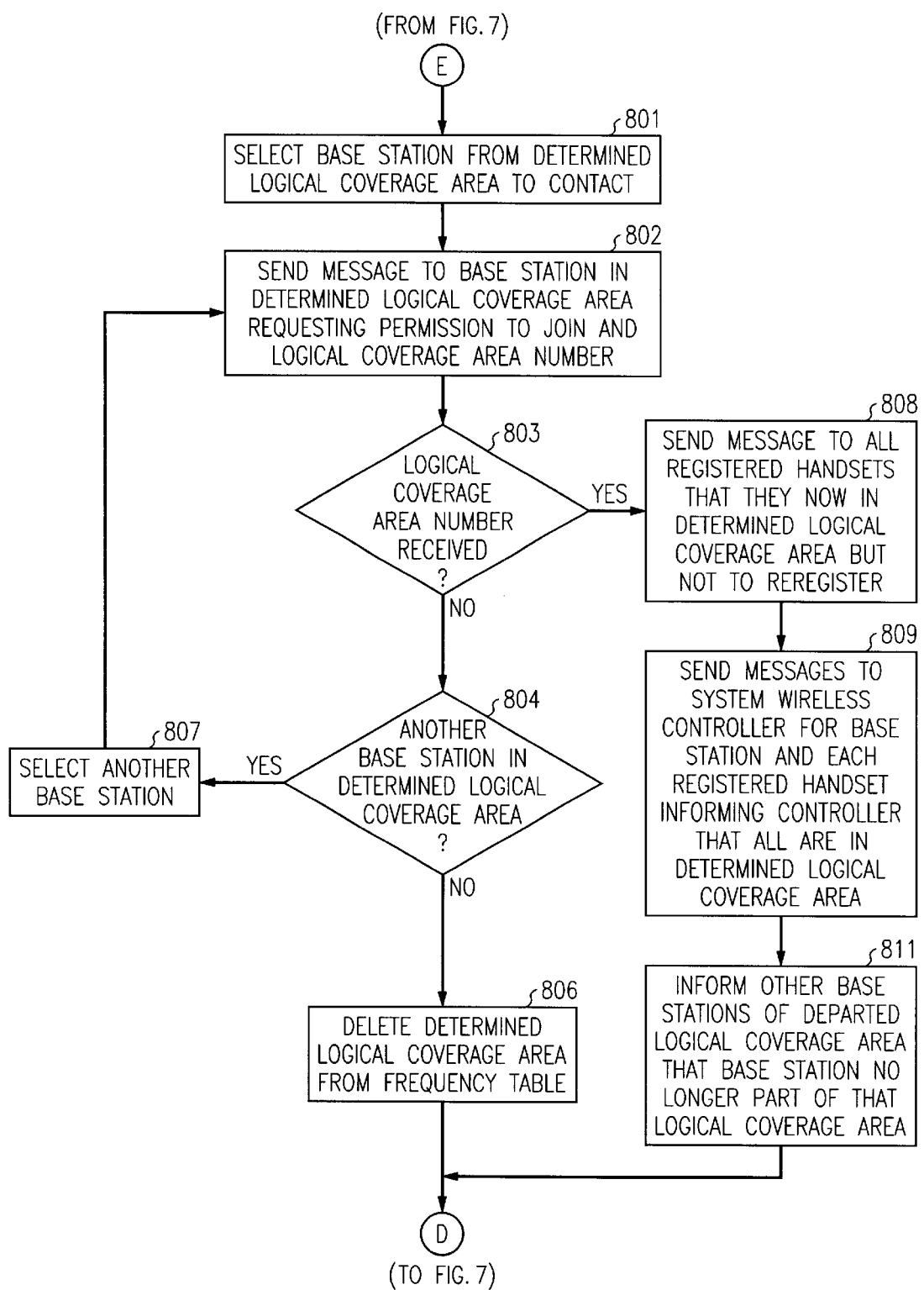
Figure 9:
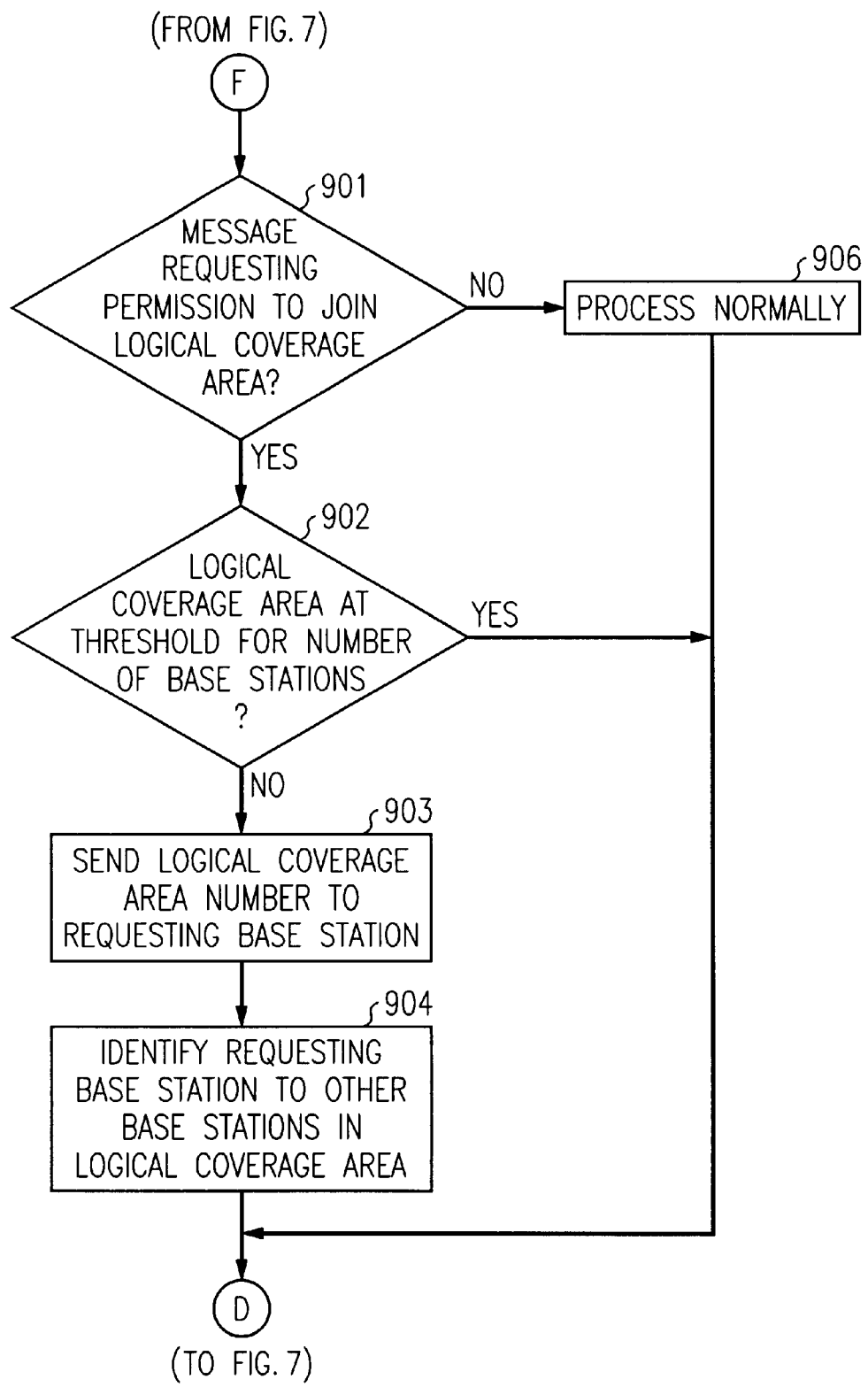

FIGS. 7–9 illustrate, in flow chart form, the steps performed by a base station in automatically transferring to a different logical coverage area. Returning to FIG. 6, after execution of block 602, control is transferred to decision block 701 that examines a frequency table that is maintained by each base station. The frequency table maintains the frequency of transfers of wireless handsets from other logical coverage area to the base station. Decision block 701 determines if the transfer rate from any logical coverage area listed in the frequency table exceeds the threshold for such transfers. If the answer is yes, the base station will join the logical coverage area exceeding the threshold. If the answer is no in decision block 701, control is transferred to decision block 702 which determines if a wireless handset is in the process of registering on the base station. If the answer is yes, decision block 703 determines if the wireless handset is already in the logical coverage area of the base station. If the answer is yes in decision block 703, control is transferred to block 707 which processes the registration operation with the wireless handset in a normal manner before returning control back to decision block 701. If the answer is no in decision block 703, control is transferred to block 704 which determines from the wireless handset the logical coverage area and base station from which the wireless handset came before transferring control to block 706. The latter block updates the frequency table with the information about the determined logical coverage area from block 704 and records the base station information before transferring control to block 707.

Returning to decision block 701, if a logical coverage area in the frequency table exceeds the threshold, control is transferred to block 801 of the FIG. 8. Block 801 selects a base station associated with the determined logical coverage area to be contacted before transferring control to block 802. The latter block sends a message to the selected base station in the determined logical coverage area requesting permission to join the logical coverage area and to receive the logical coverage area number. If the selected base station returns the logical coverage area number, this means that permission has been granted to join the logical coverage area. The steps performed by a base station such as the selected base station in block 802 are illustrated in FIG. 9. After execution of block 802, block 803 determines if the logical coverage area number has been received from the selected base station of block 801. If the answer is no, control is transferred to decision block 804 that determines if there is another base station that has been associated in the frequency table with the determined logical coverage area. If the answer is yes in decision block 804, block 807 selects another base station from the frequency table and returns control to block 802. If the answer in decision block 804 is no, block 806 deletes the determined logical coverage area with its associated base stations from the frequency table before transferring control back to decision block 701 of FIG. 7.

Returning to decision block 803, if the logical coverage area number is received back from the selected base station of block 801, control is transferred to block 808. Block 808 sends a message to all of the wireless handsets registered on the base station, performing the step of block 808, informing these wireless handsets that they are now in the determined logical coverage area as defined by the logical coverage area number received in block 803. The message transmitted in block 808 also informs the registered wireless handsets that the wireless handsets do not have to re-register. After execution of block 808, control is transferred to block 809 that sends messages to the system wireless controller for the base station and each of the registered handsets informing the system wireless controller that the base station and all of its registered handsets are now in the determined logical coverage area before transferring control to block 811. Block 811 informs the other base stations of the former or departed logical coverage area that the base station is no longer part of that logical coverage area before transferring control back to decision block 701 of FIG. 7.

FIG. 9 illustrates, in flow chart form, the steps performed by a base station upon receiving a message from another base station requesting permission to join the logical coverage area of the base station executing the steps of FIG. 9. Returning to FIG. 7, if a wireless handset registration is not determined in decision block 702, control is transferred to decision block 901 of FIG. 9. Decision block 901 determines if a message is being received from another base station is requesting permission to join the logical coverage area of the base station executing decision block 901. If the answer is no, control is transferred to block 906 which processes the stimuli being received by the base station in a normal manner before transferring control back to decision block 701 of FIG. 7. If the answer in decision block 901 is yes, control is transferred to decision block 902 that determines if the logical coverage area is at the threshold for the number of base stations that are allowed to be in a logical coverage area. If the answer is yes, control is transferred back to decision block 701 of FIG. 7. If the answer in decision block 902 is no, block 903 transmits the logical coverage area number to the requesting base station, and identifies the requesting base station to the other base stations in the logical coverage area before transferring control back to decision block 701 of FIG. 7.

Of course, various changes and modifications to the illustrative embodiments described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method for controlling the registration of a plurality of wireless handsets that are registered on a base station, comprising the steps of:

detecting by the base station a need to transfer to a second logical coverage area from a first logical coverage areas executing by the base station the transfer to the second logical coverage area; and transmitting a first message to the plurality of wireless handsets by the base station notifying the plurality of wireless handsets of the transfer to the second logical coverage area and that the plurality of wireless handsets are not to re-register on the base station.

2. The method of claim 1 further comprises the step of transmitting one of a set of second messages to system wireless controller for each of the plurality of wireless handsets informing the system wireless controller that each of the plurality of wireless handsets is now in the second logical coverage area.

3. The method of claim 2 further comprises the step of using the second logical coverage area by the plurality of wireless handsets in response to first message without re-registering on the base station.

4. The method of claim 3 further comprises the step of directing all incoming telephone calls for the plurality of wireless handsets to the second logical coverage area by the system wireless controller.

5. An apparatus for performing the method of claim 1.

* * * * *